United States Patent
Christenson et al.

(10) Patent No.: US 8,397,602 B2
(45) Date of Patent: Mar. 19, 2013

(54) COMPRESSED HUB DAMPER

(75) Inventors: Bruce G. Christenson, Canton, MI (US); Suhale Manzoor, Cement City, MI (US)

(73) Assignee: Metavation, LLC, Southfield, MI (US)

( * ) Notice: Subject to any disclaimer, the term of this patent is extended or adjusted under 35 U.S.C. 154(b) by 637 days.

(21) Appl. No.: 11/770,076

(22) Filed: Jun. 28, 2007

(65) Prior Publication Data
US 2009/0000421 A1 Jan. 1, 2009

(51) Int. Cl.
F16F 15/10 (2006.01)
F16F 15/14 (2006.01)

(52) U.S. Cl. ..................................... 74/574.4

(58) Field of Classification Search .......... 74/572.2, 74/574.4, 573.12, 433.5, 574.3, 572.21; 464/180; 474/94; F16F 15/14
See application file for complete search history.

(56) References Cited

U.S. PATENT DOCUMENTS

| | | | |
|---|---|---|---|
| 379,022 A * | 3/1888 | Morgan | 74/443 |
| 1,701,518 A | 2/1929 | Walker | |
| 1,838,023 A * | 12/1931 | Manville | 74/433.5 |
| 1,894,432 A * | 1/1933 | Watson | 254/327 |
| 2,450,701 A | 10/1948 | Wahlberg et al. | |
| 2,885,870 A | 5/1959 | Jaklitsch | |
| 3,108,490 A | 10/1963 | Turlay | |
| 3,410,369 A * | 11/1968 | Ishizuka | 188/379 |
| 4,023,438 A * | 5/1977 | Birkle et al. | 74/574.4 |
| 4,114,246 A | 9/1978 | Kamman | |
| 4,150,587 A | 4/1979 | Bremer, Jr. | |
| 4,585,431 A * | 4/1986 | Umeda et al. | 474/94 |
| 5,180,264 A * | 1/1993 | Farwell | 411/32 |
| 5,957,740 A | 9/1999 | Matsuda et al. | |
| 6,547,053 B2 * | 4/2003 | Shih | 192/55.61 |
| 6,742,412 B2 | 6/2004 | Feldhaus et al. | |
| 6,875,113 B2 | 4/2005 | Nichols | |
| 7,372,182 B2 * | 5/2008 | Poore et al. | 310/156.36 |
| 2003/0005792 A1 * | 1/2003 | Ninomiya et al. | 74/572 |

* cited by examiner

Primary Examiner — Marcus Charles
Assistant Examiner — Thomas Diaz
(74) Attorney, Agent, or Firm — Wood, Herron & Evans, LLP

(57) ABSTRACT

A torsional vibration damper includes front and rear hub members with an inertia mass between the two hub members. Annular elastomeric rings are positioned between the front and rear hub members and the inertia mass holding the inertia mass. Fasteners extend through the front hub member, the inertia mass, and fixed to the rear hub member. A clearance between the fastener and the inertia mass allows relative motion to absorb torsional vibration.

11 Claims, 4 Drawing Sheets

COMPRESSED HUB DAMPER

FIELD OF THE INVENTION

The invention relates to torsional vibration dampers and, in particular, to vibration dampers adapted to be mounted on rotatable shafts such as the crankshaft of an internal combustion engine.

BACKGROUND OF THE INVENTION

Torsional vibration dampers are employed extensively in internal combustion engines to reduce torsional vibrations delivered to rotatable shafts. The torsional vibrations may have a considerable amplitude and, if not abated, can potentially damage gears or similar structures attached to the rotatable shaft and cause fatigue failure of the rotatable shaft. Torsional vibration dampers absorb vibration and, to a certain extent, reduce the amplitude of the vibrations by converting the vibrational energy to thermal energy as a result of the damping action. The absorption of the vibrational energy lowers the strength requirements of the rotatable shaft and, therefore, lowers the required weight of the shaft. The torsional vibration damper also has a direct effect on inhibiting vibration of nearby components of the internal combustion engine which would be affected by the vibration.

Virtually all motor vehicles with internal combustion engines incorporate a "serpentine" drive belt system consisting of a single endless drive belt and a series of pulleys. The pulleys derive power from the endless drive belt and operate to drive the various vehicle accessories such as the engine fan, power steering pump, air pumps, air conditioning unit, and the alternator. The endless drive belt that drives each of these pulleys is driven by a drive pulley connected to the crankshaft of the internal combustion engine. To reduce the transfer of vibrations between the crankshaft and the serpentine drive belt system, the drive pulley may comprise a torsional vibration damper that functions to absorb vibration and reduce the amplitude or magnitude of the angular vibrations delivered by the crankshaft.

With torsional vibration dampers it is generally desirable to maximize the inertia within the space permitted. Typically, torsional vibration dampers rely on an annular inertia member that rests on an elastomeric ring compressed between the inertia ring and a hub. With such a design, if one is to replace the rubber component, one must remove the damper from the crankshaft of the engine. This is relatively labor intensive. Further, with this design, assembly is problematic. The elastomer must be compressed during assembly of the damper. This requires special equipment which, in turn, increases the cost of the damper.

SUMMARY OF THE INVENTION

The present invention is premised on the realization that a torsional vibration damper with a large inertia in a minimal space can be formed by having an inertia member that extends approximately from the central opening of hub of the damper to the perimeter of the damping/absorption. Separate front and rear hub members are fastened together with the inertia mass held between the hub members. Annular elastomeric rings are located between the hub members and the inertia mass to provide the vibration damping. Fasteners extend through the hub members and the inertia member with a clearance provided between the inertia mass and the fasteners. This allows movement of the inertia mass relative to the hub members.

This design increases the inertia mass within the space provided, and allows the elastomeric members to be replaced without removing the entire damper. Further, when this damper is initially assembled, no special equipment is required to attach the inertia mass to the hub member because the elastomeric members are compressed by simply tightening the fasteners.

The objects and advantages of the present invention will be further appreciated in light of the following detailed description and drawings in which:

DETAILED DESCRIPTION

Figure 1:
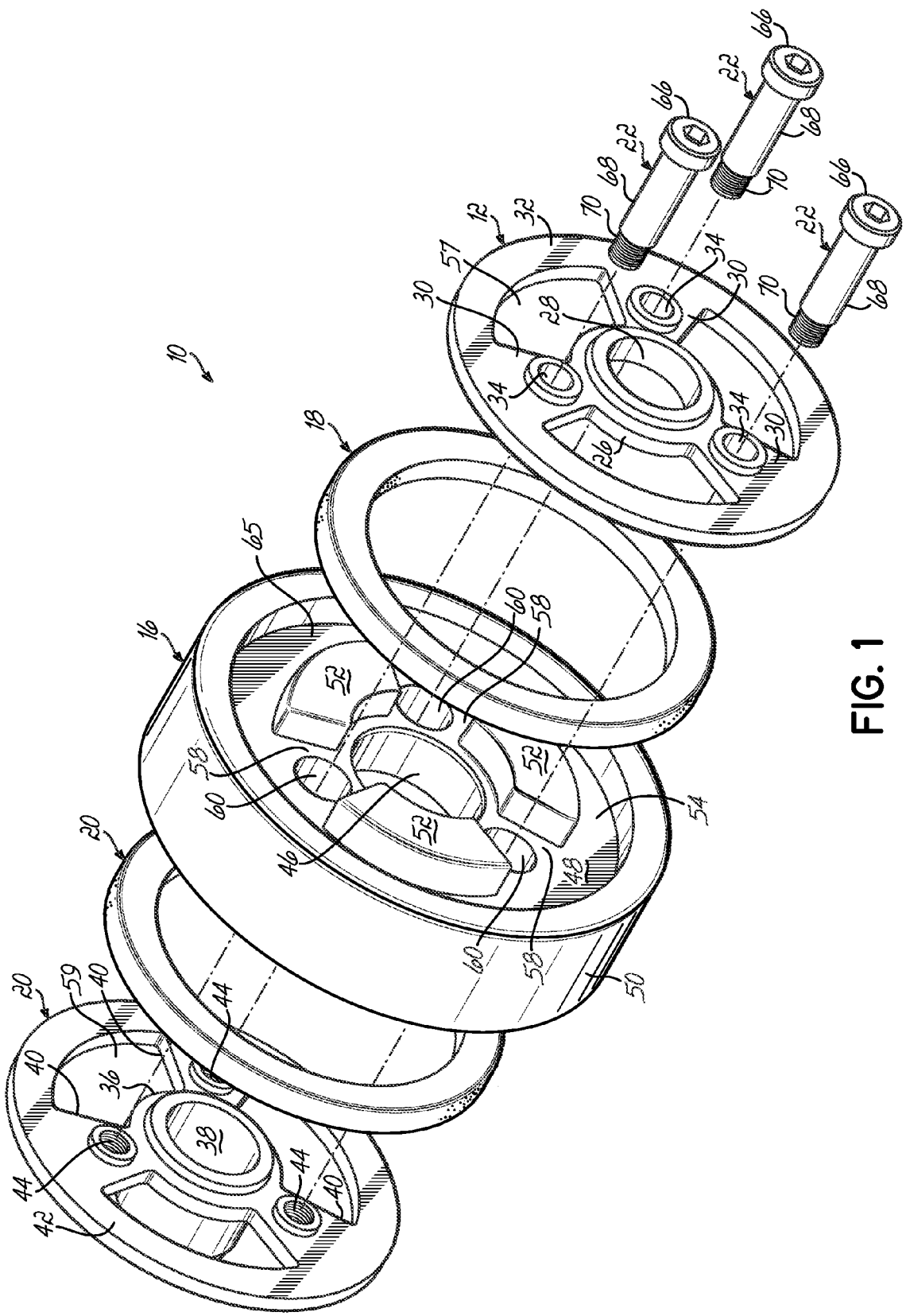
FIG. 1 is an exploded perspective view of the present invention.
Figure 2:
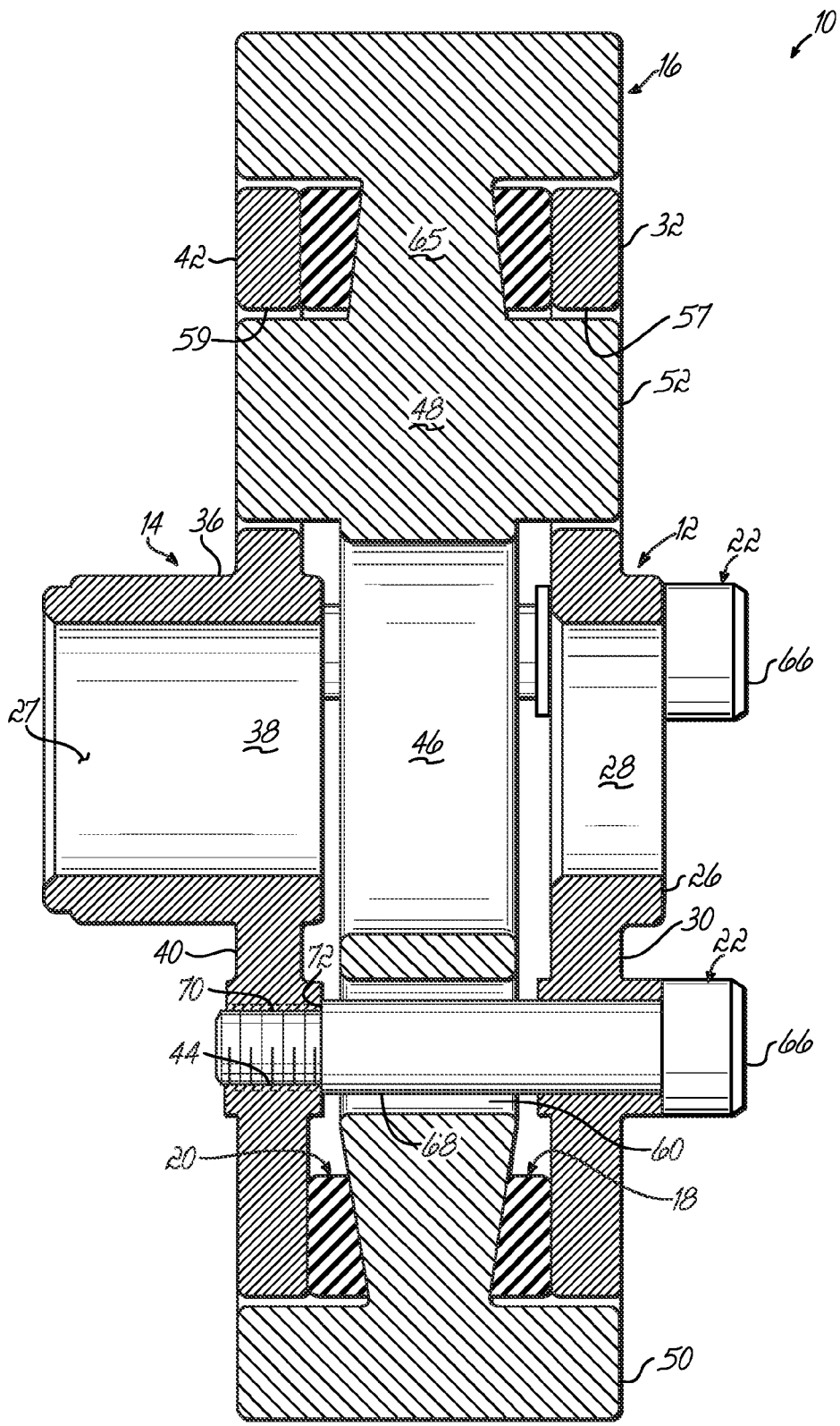
FIG. 2 is a cross sectional view of the present invention.

As shown in FIGS. 1 and 2, damper 10 includes a first hub member 12, a second hub member 14, an inertia mass 16, and first and second compressible or elastomeric rings 18 and 20. This damper 10 is held together with shoulder bolts 22 and attaches to crankshaft 24.

The first hub member 12 includes a first central hub 26 having a first central opening 28 with spokes 30 extending radially outwardly from hub 26 to an annular ring 32. There are a series of holes or openings 34 between spokes 30.

Likewise, second hub member 14 includes a second hub 36 with a second central opening 38. The hub member 14 further includes spokes 40 that extend radially outward from the second hub 36 and extend to an outer annular ring 42. Internally threaded holes 44 extend through the spokes 40. As shown, the second hub 36 of second hub member 14 is axially elongated to provide an engaging surface 27 with a shaft (not shown).

In turn, the inertia mass 16 includes a central opening 46 that is slightly larger than the first and second central openings 28 and 38, respectively. A central annular mass 48 extends from the central opening 46 peripherally outward to a peripheral annular ring 50. The thickness and size of annular ring 50 can be established to create the necessary mass for the inertia mass 16.

Extended from the central annular mass 48 are rounded trapezoidal protrusions 52. These protrusions 52 extend from first and second sides 54 and 56 of inertia mass 16 and occupy spaces 57 and 59 between spokes 30 and 40, respectively. These protrusions 52 increase the inertia of the ring without increasing its outer peripheral dimension. Between the protrusions 52 and annular mass 48 of inertia mass 16 are narrow portions 58 which are slightly larger than the size of spokes 30 and 40, permitting movement of the inertia mass 16 relative to the first and second hub members 12 and 14. Likewise, these narrow portions 58 include holes 60 which are slightly larger than the holes 34 and 44 in spokes 30 and 40, again, to permit relative movement of the inertia mass 16 relative to the first and second hub members 12,14 as is discussed hereinafter.

The inertia mass 16 includes a narrowed annular portion 65, which accommodates the elastomeric rings 18 and 20. As shown, the first and second elastomeric rings 18 and 20 are located or held in compression between ring 32 and ring 42, and the first and second sides 54 and 56 of the inertia mass 16 at the annular portions 65. Annular portions 65 narrow from the central annular mass 48 to the peripheral annular ring 50.

The bolts 22 include a head portion 66, a shaft 68 and a threaded portion 70, which is narrower than shaft 68, leaving a shoulder 72. The bolts 22 extend through the holes 34 in the first hub member 12, through the holes 60 in the inertia mass, and are threaded into internally threaded holes 44 in the second hub member 14 with the shoulder 72 engaging the interior side of spoke 40. The length of the shaft 68 is designed so that when nut 22 is fully threaded into hole 44, the elastomeric rings 18 and 20 are compressed between the rings 32 and 42, and the narrow ring portion 65 of inertia mass 16, but no part of the first or second hub members 12,14 is in contact with the inertia mass 16. The diameter of shaft 68 is equal to the inner diameter of the holes 34 in spokes 30, but is narrower than the holes 60 in the inertia mass 16. The size differential is a matter of choice, but is generally designed to allow for 1 to 3 degrees of relative motion between the inertia mass and the first and second hub members 12 and 14.

The elastomeric rings 18 and 20 are generally identical and are formed from any desired elastomeric material that is suitable for automotive applications. Generally, SBR, EPDM or Vamac is suitable for rings 18 and 20. The hardness of the rings is chosen to meet the end use requirements of the damper 10.

This product can be assembled using an assembly fixture with locators to properly position the first and second hub members. The assembled damper can be fixed to the crankshaft in any manner, such as press fitting, fasteners, or the like. This assembly method is very simple and does not require any special apparatus to compress the elastomeric vibration absorbing material used in the damper 10, significantly reducing the cost of the damper. Further, if the elastomeric member must be removed, the hub member 14 does not have to be removed from the crankshaft, significantly reducing the cost of repairing a damper.

The embodiments shown in the present invention can obviously be modified. For example, the outer surface of the inertia mass 16 can be configured to drive a serpentine belt, as desired. Further, the shoulder bolts 22 can be replaced by standard bolts with sleeves.

Figure 3:
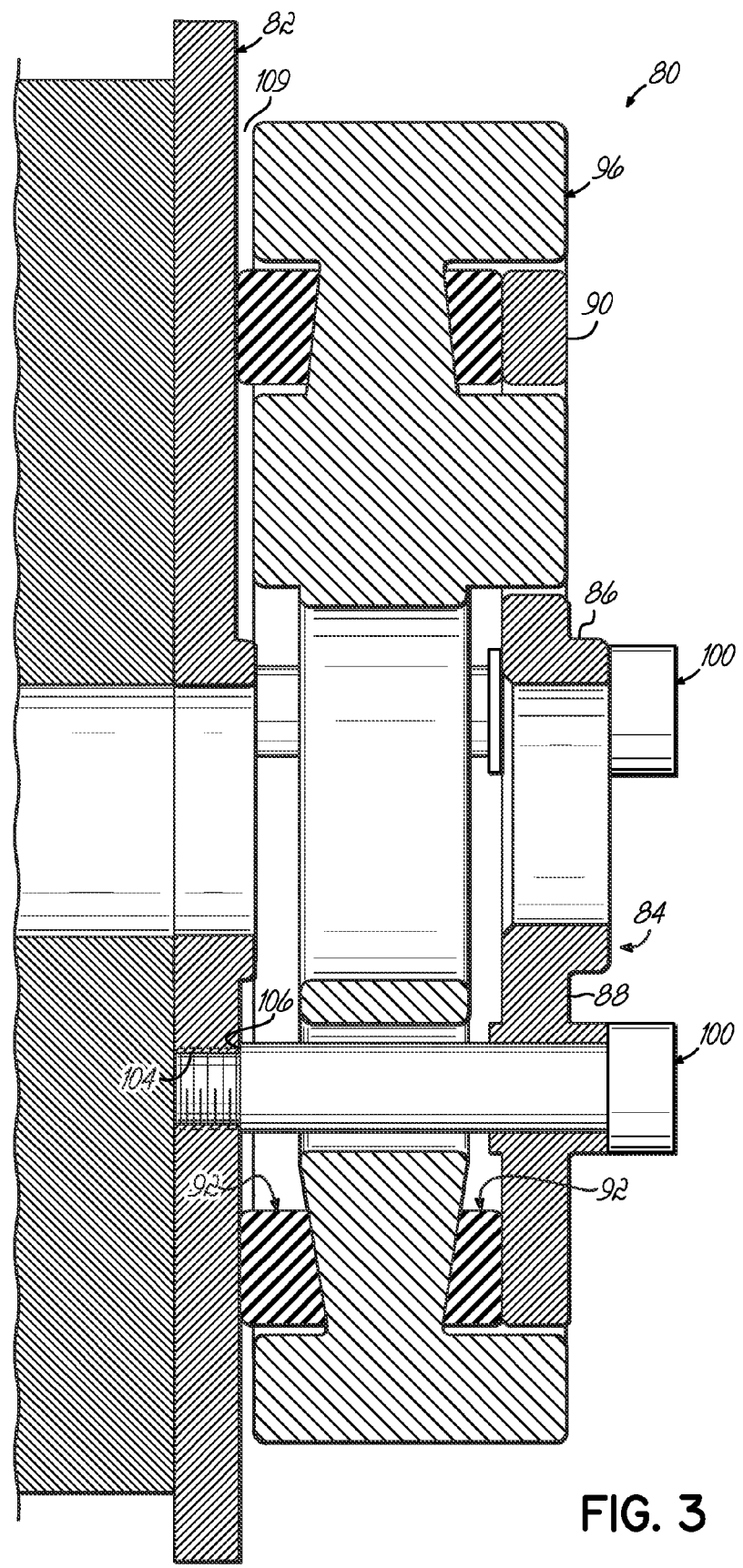
FIG. 3 is a cross sectional view of an alternate embodiment of the present invention partially broken away.

An alternate embodiment of the present invention in which the second hub member 14 is eliminated is shown in FIG. 3. In this embodiment, damper 80 is fixed to a rotating plate 82, such as the outer surface of a viscous damper. The hub member 84 includes a hub 86 with spokes 88 and ring 90, which presses elastomeric ring 92 against the inertia mass 96, which, in turn, forces the inertia mass 96 against the second elastomeric ring 98 into compression between the inertia mass 96 and the plate 82. Shoulder bolts 100 screw into internally threaded holes 104 of plate 82 with the shoulders 106 engaging the plate 82, stopping further movement. This provides space 109 between the inertia mass 96 and the plate 82 to permit relative movement. Spacing is also provided between shoulder bolts 100 and the inertia mass 96, to, again, provide for 1 to 3 degrees relative movement of the inertia mass relative to the hub. This embodiment has the same advantages as the embodiment shown in FIGS. 1 and 2, and allows the invention to be attached, for example, to a viscous damper.

Figure 4:
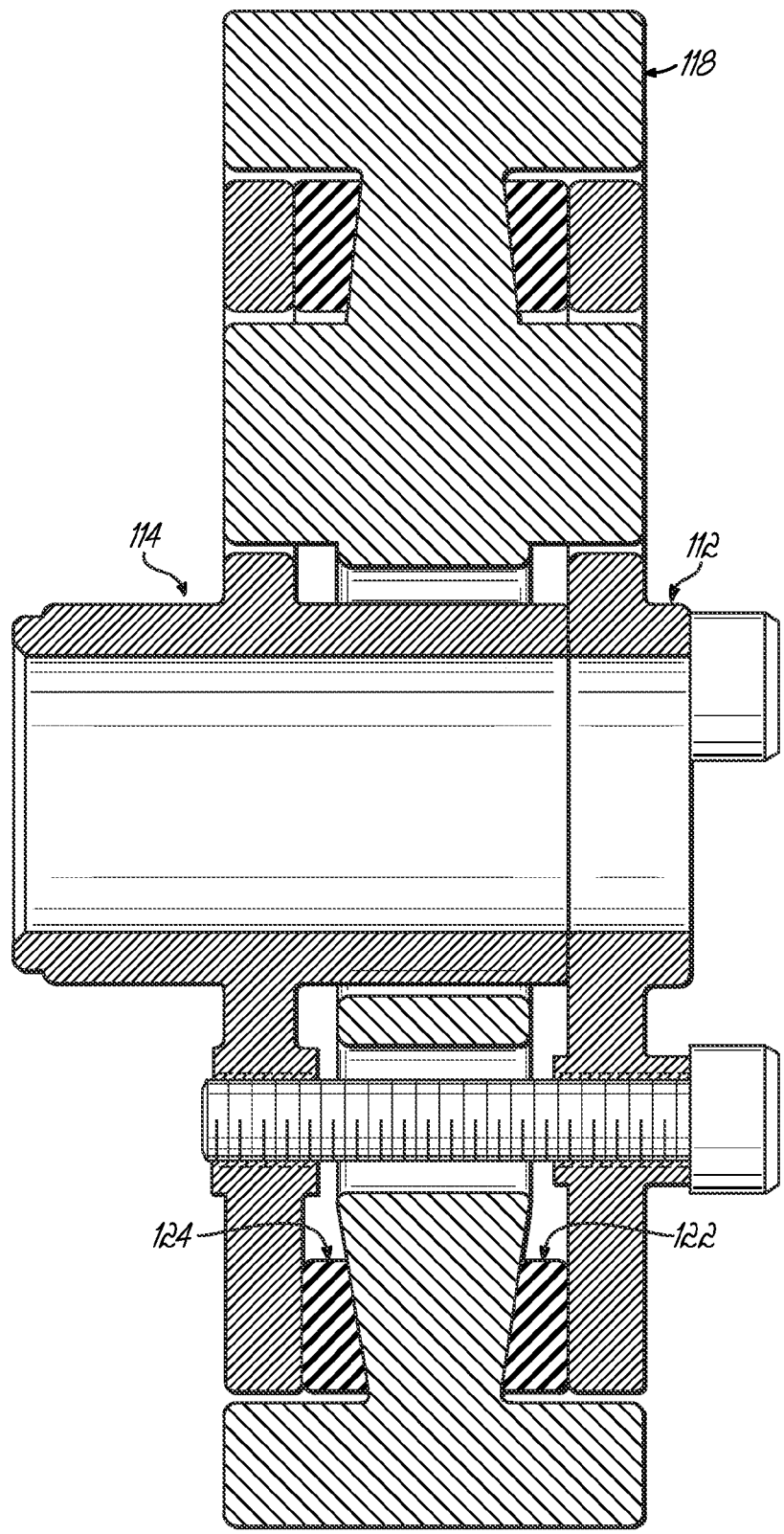
FIG. 4 is a cross sectional view of a second alternate embodiment of the present invention.

FIG. 4 shows an alternate embodiment in which the first hub 112 contacts the second hub 114. In this embodiment, the inertia mass 118 extends from the second hub 114 outwardly with a slight clearance between the second hub and the inertia mass. Thus, the hubs establish the desired separation of the hub members 112 and 114 from the inertia mass 118, as well as the compression of rings 122 and 124.

Each of these embodiments provide the advantages of the present invention, including ease of assembly and ease of repair, and with the savings and costs associated therewith.

This has been a description of the present invention along with the preferred method of practicing the present invention. However, the invention itself should only be defined by the appended claims.

What is claimed is:

1. A torsional vibration damper comprising a first hub member attached to a shaft, said first hub member having a first hub having a first central opening, said shaft extending through said first hub at said first central opening, said first hub member further having a first ring member radially spaced from said first hub member;
   an inertia mass having a second central opening aligned with said first central opening;
   a first compressible ring and second compressible ring;
   a plurality of fasteners, each fastener extending through a respective first hole in said first hub member and a respective second hole in said inertia mass, said fasteners compressing said first compressible ring and said second compressible ring against a first side and a second side of said inertia mass and connecting said inertia mass to said first hub member;
   wherein said inertia mass narrows along said first side which contacts said first compressible ring and said second side which contacts said second compressible ring; and
   wherein a clearance is provided between said fasteners and said inertia mass permitting said inertia mass to move radially relative to said first hub member.

2. The vibration damper claimed in claim 1 further comprising a second hub member having a second hub and a second ring member wherein said second hub member is attached to said first hub member by said fasteners.

3. The vibration damper claimed in claim 2 wherein said first hub member and said second hub member each have spokes extended between said first hub and said second hub and said first compressible ring and said second compressible ring, and wherein said fasteners extend through said spokes.

4. The vibration damper claimed in claim 3 wherein said spokes are separated by spaces and wherein said inertia mass includes protrusions which extend laterally outward into said spaces.

5. The vibration damper claimed in claim 2 wherein said fasteners are shoulder bolts limiting the compression between said first hub member and second hub member.

6. The vibration damper claimed in claim 2 wherein said fasteners are bolts and include sleeves surrounding said bolts wherein said sleeves limit the compression of said first and second hub members.

7. The vibration damper claimed in claim 2 wherein said first hub engages said second hub thereby limiting the compression between said first hub member and said second hub member.

8. The vibration damper claimed in claim 1 wherein said compressible rings are elastomeric rings.

9. The vibration damper claimed in claim 1 wherein said fasteners attach said first hub member to a plate member with said second compressible ring compressed between said inertia mass and said plate member.

10. A torsional vibration damper comprising a first hub member attached to a shaft;
   said hub member having a first hub having a first central opening said first hub member having a first ring member radially spaced from said first hub, said shaft extended through said first central opening, an inertia mass having a second central opening aligned with said first central opening;

a first compressible ring and a second compressible ring;

a plurality of fasteners, each fastener extending through said first hub member and a hole in said inertia mass, said fasteners compressing said first compressible ring and said second compressible ring against first and second sides of said inertia mass and connecting said inertia mass to said first hub member;

wherein said first hub member has spokes extended between said first hub and said first ring; said spokes separated by first spaces and wherein said inertia mass includes protrusions which extend laterally outward into said first spaces.

11. The vibration damper claimed in claim 10 further comprising a second hub member having a second hub and a second ring said second hub member and second ring separated by spokes and having second spaces between said spokes and wherein said inertia mass includes portions which extend laterally outward into said second spaces of said second hub.

* * * * *